March 30, 1937. O. C. CORDES 2,075,095
CUTTER REGISTER CONTROL
Filed April 12, 1934 3 Sheets-Sheet 1
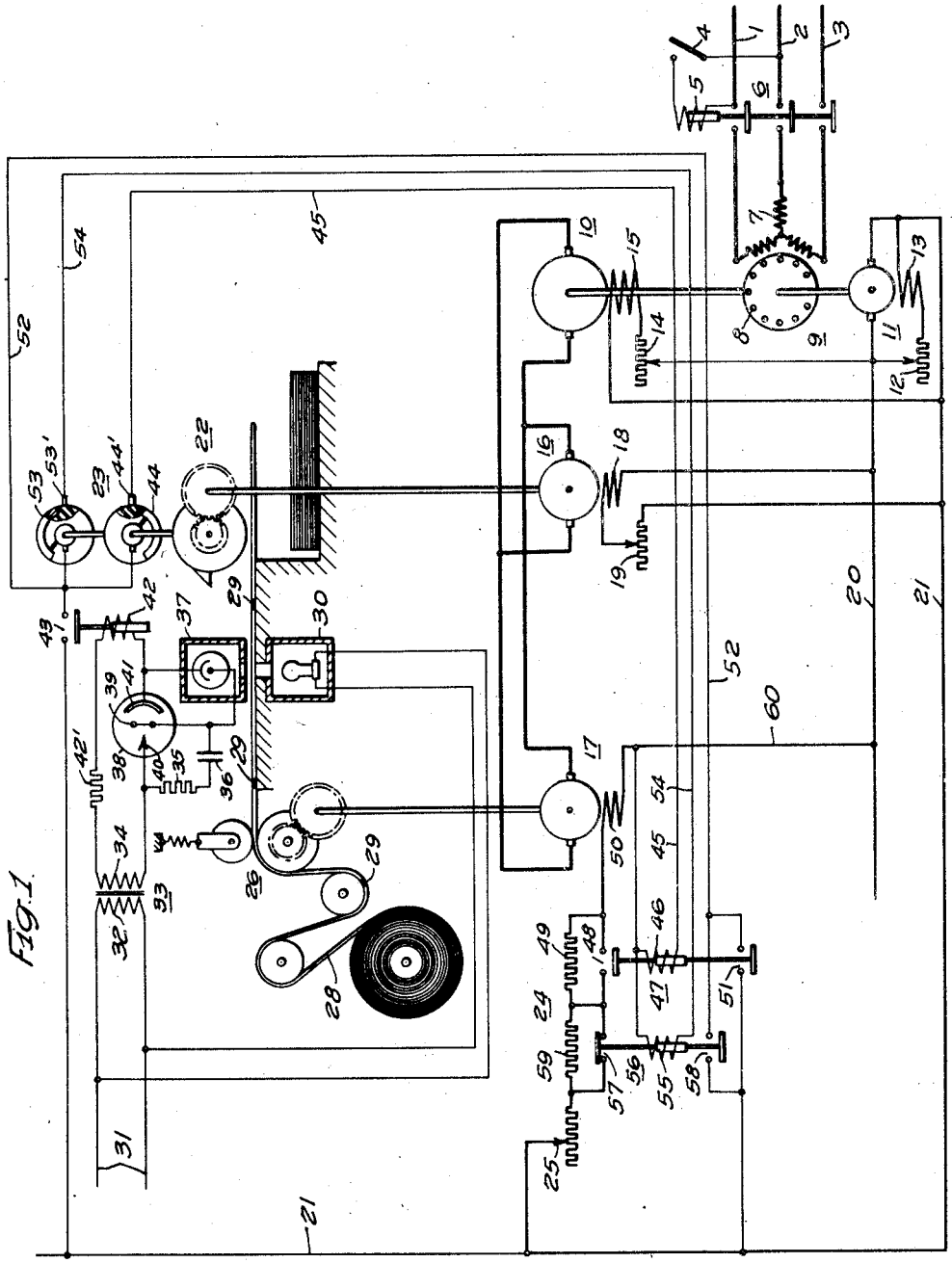

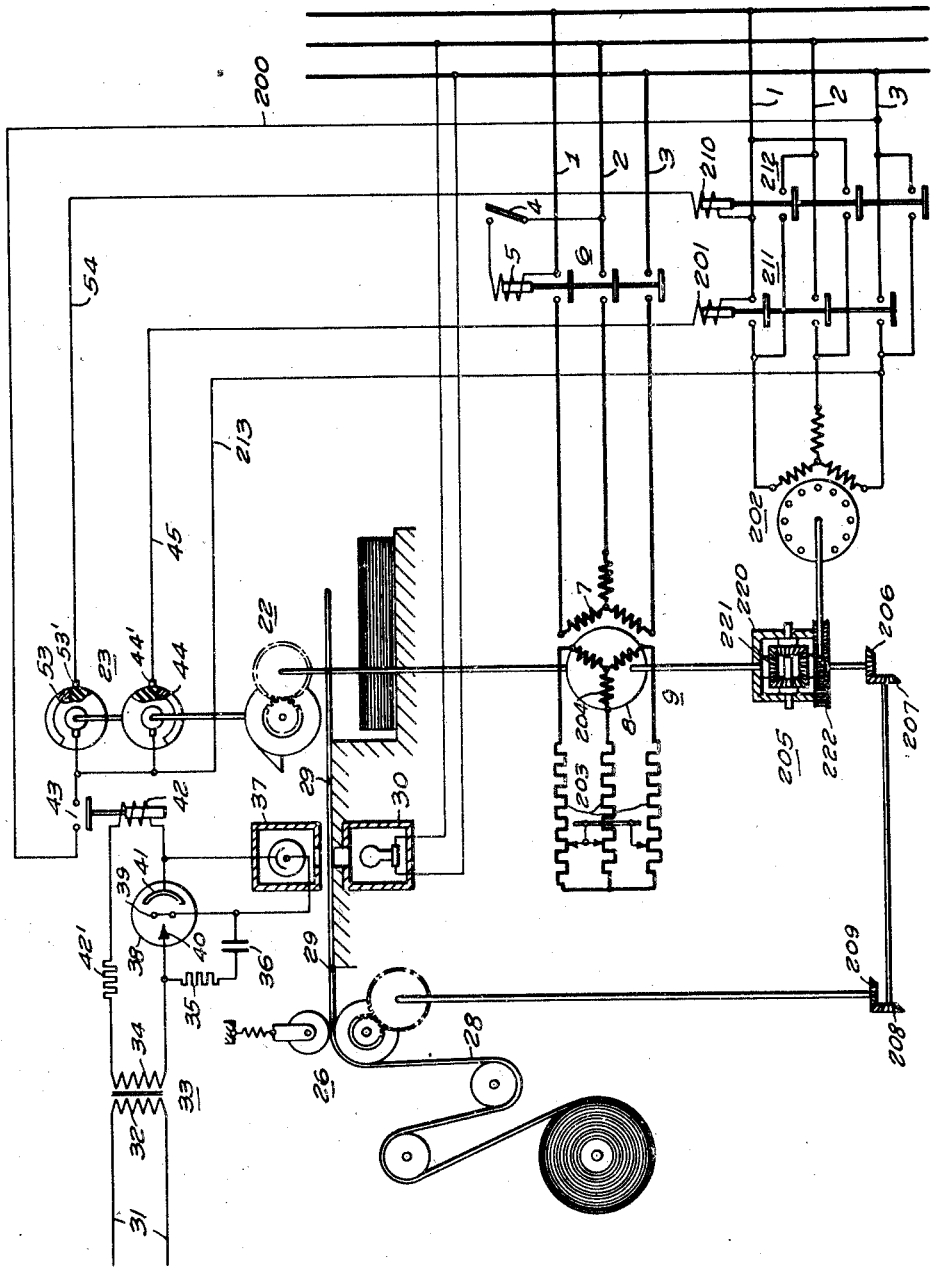

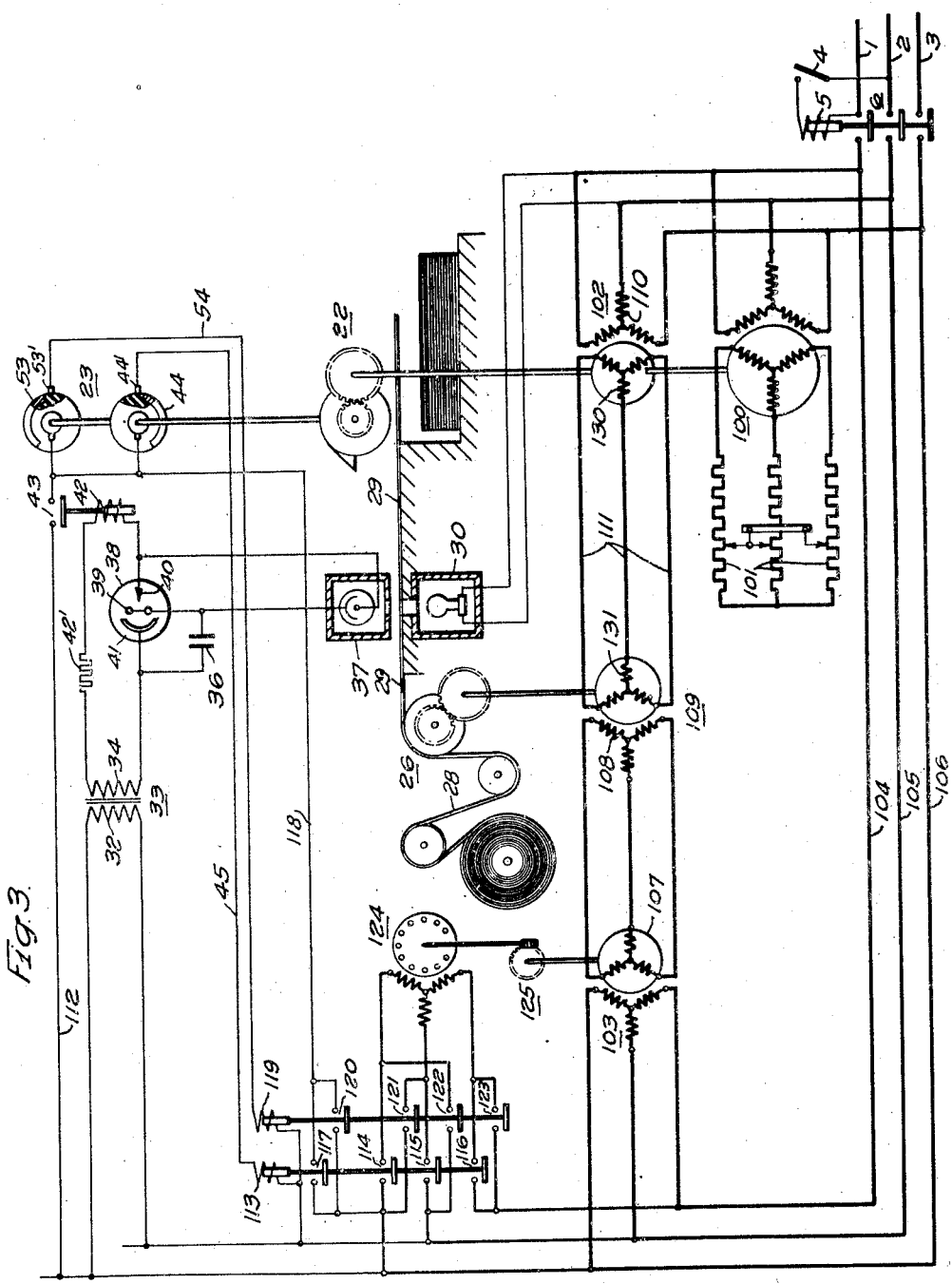

Patented Mar. 30, 1937

2,075,095

UNITED STATES PATENT OFFICE 2,075,095

CUTTER REGISTER CONTROL

Oscar C. Cordes, Upper Darby, Pa., assignor to Westinghouse Electric & Manufacturing Company, East Pittsburgh, Pa., a corporation of Pennsylvania Application April 12, 1934, Serial No. 720,281

15 Claims. (Cl. 164—68)

This invention relates generally to electrical control systems for apparatus operating on web material, and more especially to electrical control systems involving electronic means and light-sensitive means for controlling the relative positions and relative speeds of certain parts of a machine operating on a web.

In the art of paper cutting or printing, for example, the operation on the paper or web of material, when moving from a supply reel past certain rolls to the cutter, nearly always involves slippage. Thus the paper becomes shifted with reference to the cutter or other machine operating on the web or paper. Even when there be no slippage, the hygroscopic characteristics of paper, or the temperature, or both, cause a change in its dimension with changes of relative humidity and/or changes in temperature, with the result that the cutter will not cut the paper along the desired line. Slippage and the moisture effect may, of course, occur simultaneously.

The problems to be met and the characteristics of web material, as previously pointed out, are of particular concern in the manufacture of paper bags provided with printed material which is to have a definite relation with reference to the bag, and it is, therefore, quite imperative that the cutting operation of the material from which the bags are to be made takes place in a definite relation with reference to the bag material.

The slippage of the material to which reference has been made with regard to paper may also occur in the manufacture of rubber, the drawing of wire, the rolling of steel sheets, and other industrial applications. My control system is, therefore, not to be limited to operations on paper or similar web material, but is readily applicable to the operations on other materials named above, as well as on similar materials not mentioned.

It is an object of this invention to control the operation of apparatus operating on a web so that the required operation on the web will take place at the right point regardless of the slippage of the web or the change of its dimensions or both.

Another object of this invention is to control the relative speeds of a cutter and the feeding means of a machine operating on a web by photo-electric control means.

A further object of this invention is to control the position of the web in a machine by photo-electric control means.

A still further object of this invention is to control the relative speeds of certain parts of a machine operating on a web and the relative position of these parts by the cooperative action of photo-electric and thermionic means.

Other objects and advantages will become apparent from a study of the following specification when considered in conjunction with the accompanying drawings, in which:

Figure 1 is a diagrammatic showing of the cutter, web feeding device, and driving means therefor;

Fig. 2 is a diagrammatic view, similar to the one shown in Fig. 1, of a modification wherein the speed control is effected in a different manner than is the case for the form shown in Fig. 1; and Fig. 3 is a diagrammatic showing of a still further modification of this invention.

Referring generally to Fig. 1, it will be noted that a cutter 22 operates to cut the web 28 and that a feeding device 26 is provided to feed the web to the cutter 22. A pair of motors 16 and 17 are provided to drive the cutter and feeding means, respectively.

The motors 16 and 17 are connected directly to a main generator 10 of a motor generator set consisting of the motor 9 and the generator 10. Mounted on the same shaft with the main generator is an exciter 11 which provides the excitation current for the main generator 10 and both the motors 16 and 17. The exciter 11 and the main generator 10 and the motors 16 and 17 are provided with adjustable field rheostats 12, 14, 19 and 25, respectively, to control the voltages of exciter 11 and generator 10 and the excitation, and thus the speeds, of the motors 16 and 17.

The motor 17 is provided with additional speed control means 24, the effective resistance value of which is controlled by a pair of speed control contactors 47 and 56. A drum controller 23 is mounted on the shaft of the cutter 22 and cooperates with a contactor 43 controlled by the thermionic means 38 which, in turn, is controlled by the cooperative action of a source of light 30 and light sensitive means 37.

The control is such that when the cutter is for any reason not cutting the web at the proper section line, the speed of motor 17 is either increased or decreased, as needed, with reference to the speed of motor 16 to thus position the cutter properly with reference to the indicia on the web 28.

A better understanding of this invention can probably be had from a study of a complete cycle of operation for the cutter and feeding means and the control means therefor, referring first to the showing in Fig. 1. Assuming that conductors 1, 2 and 3 are suitably energized from a source of supply, not shown, and that actuating coil 5 of the main contactor 6 is energized by the closure of the starting switch 4. It will thus be noted that the primary winding 7 of the squirrel cage motor 9 is energized and the rotor 8 will drive the main generator 10 and the exciter 11. The exciter 11 is provided with a field winding 13 having an adjustable rheostat 12 whereby the voltage of the exciter may be varied at will. The main generator is provided with a field winding 15 and an adjustable rheostat 14. By suitable manipulation of the rheostats 12 and 14 the voltage of the main generator 10 can be varied over a considerable range. By such voltage control the speeds of the cutter 22 and the feeding mechanism 26 can be varied from stand-still to normal operating speed.

The motor 16 driving the cutter 22 is connected directly to the main generator. The field winding 18 and an adjustable rheostat 19 are connected to the buses 20 and 21 of the exciter 11. The speed of the motor 16 may thus be varied independently of the voltage variation of the generator 10. The motor 17 is electrically connected directly to the generator 10 and has its field winding 50 connected to the buses 20 and 21 of the exciter 11 by a circuit extending from bus 20 through conductor 60, field winding 50, resistor section 49 of the speed-control means 24, contact member 57 of the speed-control contactor 56, and adjustable field rheostat 25 to the bus 21. The adjustable rheostat 25 also provides for individual speed adjustment of motor 17. The rheostats 19 and 25 will in practice be so adjusted that the cutter 22 and the feeding mechanism 26 will be brought up to speed together and operate at substantially the same speed.

The material 28 is provided with indicia 29 which intermittently obstructs the light from the source of light 30 to the light-responsive means 37. Every time the indicia passes between the source of light and the light sensitive means, the thermionic means 38 has the bias of its grid 39 changed with reference to the cathode 40 so that a current will flow through the coil 42 of the contactor 43. The circuit for this coil, before tube 38 becomes conducting, may be traced from the source of alternating current 31 through the primary 32 and secondary 34 of transformer 33, through resistor 35, capacitor 36 and photo-sensitive device 37. This current is small and alternating and thus does not cause operation of contactor 43. However, when the bias of the grid 39 has changed with reference to the cathode 40, a heavy current will flow directly from the cathode 40 through the anode 41, actuating coil 42, and resistor 42' to the secondary 34 of the transformer 33. Since thermionic means of this character acts as a rectifier a uni-directional current will flow through actuating coil 42, thus closing the contactor 43.

If the cutter operates properly with reference to the indicia 29, no speed change of the motor 17 is needed and in consequence neither of the contactors 56 nor 47 will be caused to operate, because the drum controller 23 will be in such a position as not to complete a circuit for these contactors.

When the feeding device 26 is operating too fast, the segment 44 will make contact with the brush 44', thereby establishing a circuit from bus 20 through conductor 60, actuating coil 46, of the speed control contactor 47, conductor 45, brush 44', segment 44 and contactor 43 to the bus 21, whereby contact members 48 and 51 will be closed. The closing of the contact members 51 establishes a holding circuit for actuating coil 46 which circuit extends from the segment 44 through conductor 52 and contact members 51 to the bus 21. The speed-controlling action of contactor 47 will thus continue independently of the operation of the photo-sensitive device 37 until the segment 44 passes from under the brush 44', the length of the segment determining the length of time the correction is made. The operation of the photo-sensitive device 37, initiates the speed control only and does not influence the length of time of the speed control of the feeding device 26.

The closing of the contact members 48 shunts the resistor section 49, thereby decreasing the speed of motor 17 and at each impulse from the photo-sensitive device 37 bringing this motor to the lower speed for a time determined by the length of the segment 44 until the cutter again operates properly with reference to the material being operated upon.

When the cutter operates too slowly, segment 53 will take a position to complete a circuit when the contactor 43 is closed, which circuit may be traced from the bus 20 through conductor 60, actuating coil 55 of the speed-control contactor 56, conductor 54, brush 53' and segment 53 through contactor 43 to the bus 21. Closure of contact members 58 or 51, provides a holding circuit for control contactor 56 through the conductor 52. The speed of the motor 17 is thus increased, because the shunt circuit for resistor section 59 through the contact members 57 is opened and this increased speed is continued intermittently until the cutter is again in proper relation to the indicia on the web.

In Fig. 2 the arrangement of the various elements is somewhat different from that of Fig. 1, namely, a main wound-rotor induction motor 9, having a primary winding 7 and a secondary winding 204, is connected to drive the cutter 22. By suitably varying the resistance value of the external or speed control rheostat 203 of the secondary 204, the speed of the cutter may be varied at will.

Mounted on the shaft of the main motor 9 is the sun gear 221 of a differential 205. When the housing 220 of the differential 205 is stationary, as it normally will be when the speed relation between the cutter 22 and the feeding device is proper, the feeding device 26 is driven at the same speed as the cutter through the differential 205 and gears 206, 207, 208 and 209. If for any reason the cutter 22 is not properly positioned with reference to the material 28, namely, is not doing the cutting operation at the proper or designated section line of the material 28, then the control means hereinbefore referred to functions to start the motor 202 either in one or the other direction depending upon whether the feeding mechanism 26 is operating too slowly or too rapidly with reference to the cutter 22 to drive the housing 220 in the corresponding directions.

In the modification shown in Fig. 2, the main motor 9 is a wound rotor induction motor provided with a secondary winding 204 and the adjustable speed control rheostat 203, whereby suitable speed control for the cutter 22 and the feeding device 26 may be secured.

The feeding device 26 is driven through the gears 206, 207, 208 and 209 coupled to the sun gear 222 of a differential 205, the other sun gear 221 of this differential being mounted directly on the shaft of the motor 9. When the housing 220 of the differential 205 is not being rotated, the speed of the cutter 22 and the feeding mechanism 26 will be the same. The housing 220 is, however, connected to the rotor of a squirrel cage induction motor 202. The direction of rotation of this motor 202 may be controlled by the cooperative action of the photo-sensitive device 37, the thermionic means, the source of radiant energy 30, and the drum controller means 23 driven from the cutter.

When the feeding device 26 is operating too fast with reference to the cutter, the photo-sensitive device 37 will cause the contactor 43 to close and, since the segment 44, for the condition assumed, will be positioned to make contact with the brush 44' connected to the conductor 45, directional contactor 211 will have its actuating coil 201 energized by a circuit from conductor 3 through conductor 200, contactor 43, segment 44, brush 44', conductor 45 and actuating coil 201 to the conductor 1. The motor 202 will thus drive the casing 220 in such a direction as to subtract from the speed of the feeding mechanism 26. This speed adjustment will continue intermittently, the time being determined by the length of segment 44, until the indicia 29 are again in proper relation to the cutter. In order to accomplish this speed adjustment despite the instantaneous operation of the contactor 43, a holding circuit for contactor 211 is established through the conductor 213 which opens when segment 44 leaves brush 44'.

When the feeding mechanism 26 is too slow with reference to the cutter, segment 53 will complete a circuit for the actuating coil 210 of the control contactor 212, with the result that the motor 202 will drive the casing 220 in such a direction as to increase the speed of the feeding mechanism 26.

In the modification shown in Fig. 3, the arrangement is still different from those of Figs. 1 and 2, the speed control of the feeding device 26 with reference to the cutter 22 being entirely electrical. The main motor 100 drives the cutter 22 and a motor 109 drives the feeding device 26. An alternating current motor 102 of the induction type is mounted on the shaft of the main motor 100 and has its secondary winding 130 connected to the secondary winding 131 of the motor 109. The primary winding 108 of the motor 109 is supplied from the secondary winding 107 of a speed changer 103.

When the contactor 6 is closed, the primary winding of the speed changer 103 is obviously supplied with alternating current of line frequency. Since the motor 124 driving the secondary 107 of the speed changer is normally not operating, the frequency supplied to the primary winding 108 of the motor 109 will be line frequency. The result will be that motor 109 will remain in step, namely, will operate at identically the same speed as motor 100. When the paper has either slipped or stretched so that the cutter is no longer operating in proper relation to the printed matter that may be on the paper, the light sensitive means will cause operation of the motor 124 similar to the operation effected for motor 202 in Fig. 2 or the field control for motor 17 in Fig. 1.

Motor 124 will thus rotate the secondary 107 of the speed changer 103, thereby changing the frequency of the alternating current supplied to the motor 109 driving the feeding mechanism 26.

The direction of rotation of the motor 124 will determine the frequency of the current in the primary winding 108 and will thus determine whether the feeding device operates at a higher speed than the cutter or at a lower speed than the cutter.

In the modification shown in Fig. 3, the speed control is effected electrically. When the contactor 6 is closed, induction motor 100 of the wound rotor type having the speed control rheostat 101 is suitably energized and the primary of speed changer 103 is also suitably energized through conductors 104, 105 and 106. The frequency of the alternating current supplied to the primary winding of speed changer 103 is the frequency of the supply. Mounted directly on the shaft of the main motor 100 is the dynamo-electric machine 102 having a primary winding 110 and a secondary winding 130.

The secondary winding 107 of the speed changer 103 is directly connected to the primary winding 108 of the motor 109 which is connected to drive the feeding mechanism 26. When the relation of the cutter with reference to the printed matter on the material is correct, the motor 124 is stationary and, since the mechanism 125 is an irreversible mechanism, the secondary winding 107 is also stationary. The speed changer 103 thus operates as a transformer supplying current of line frequency to the primary winding 108. Since the secondaries 131 and 130 are interconnected by conductors 111, the motor 109 will remain in step, that is in synchronism with the main motor 100. The cutter 22 and the feeding mechanism 26 will thus operate at the same speed.

When the paper has slipped, or crept, or stretched, so that the printed matter is no longer in proper relation to the cutter, the photo-sensitive device 37 will cause the operation of contactor 43 at a time when either segment 44 or 53, as the case may be, is in a position to start the motor 124. If the device 26 is operating too slowly with reference to the cutter, segment 53 will be in such a position as to energize actuating coil 119 to close the contact members 120, 121, 122 and 123.

The circuit for coil 119 may be traced from conductor 106 through conductor 112, contactor 43, segment 53, brush 53' and conductor 54, coil 119 to conductor 105. The closing of the contact members 120 establishes a holding circuit for the actuating coil 119, whereas the closing of the contact members 121 to 123, inclusive, starts the operation of the motor 124 in such a direction as to increase the frequency of the current supplied to the primary 108, thereby increasing the speed of the feeding means 26. Holding circuits for the coils 113 and 119 are established through contact members 117 and 120 and conductor 118.

When the feeding mechanism 26 operates too rapidly with reference to the cutter 22, actuating coil 113 is energized, closing contact members 117, 114, 115 and 116. Closing of contact members 117 establishes a holding circuit for actuating coil 113, whereas the closing of contact members 114 to 116, inclusive, starts operation of the motor 124 in such a direction as to decrease the frequency of supply to the primary 108, thereby decreasing the speed of the feeding means 26.

From the foregoing discussion of the three modifications of this invention, it will be apparent that in each case the cutter is definitely and positively caused to operate in a selected manner with reference to the material and not necessarily with reference to the feeding means. That is, the material is always cut at the section line designated regardless of whether the material may have slipped, or crept, or stretched, or whether the indicia controlling the photo-sensitive device 37 may have deliberately been shifted on the material.

I desire it to be understood that the modifications, hereinabove discussed in some detail, are not the only three modifications of my invention that may be devised; but others, after having had the benefit of the teachings of this invention, may readily devise still further modifications. It is to be further understood, therefore, that this invention is not to be limited to the specific modifications shown nor described but is to be limited only by the appended claims and the pertinent prior art.

I claim as my invention:

1. In an electrical system of control for controlling the relative speeds of a pair of motors, in combination, an alternating-current motor, a second alternating-current motor, a dynamo-electric machine constituting a transmitting device, said second alternating-current motor constituting a receiving device, connections between said devices whereby said receiving device is responsive to the movements of said transmitting device, said connections including inductively related windings electrically connected to said second motor and transmitting device, and means for relatively displacing said windings as a function of the speed difference between said motors thereby maintaining a definite speed relation between said motors.

2. In a control system for a cutting machine for web-like material, in combination, a cutter, a feeding device, a cutter motor for driving the cutter, a feeding motor for driving the feeder, a source of alternating current of substantially constant frequency for effecting the operation of said cutter motor and for energizing the feeding motor, a frequency generator electrically connected to the feeding motor and the source of energy, and means for operating said frequency generator as a function of the speed difference between the feeding motor and the cutter motor to thus control the speed ratio between said motors.

3. A control system for a pair of alternating-current motors, comprising a main alternating-current motor, a machine for operating on material driven thereby, a second alternating-current motor, a second machine for supplying the material to the first machine, and driven by the second motor, said material being provided with indicia, photo-electric means responsive to the position of the indicia on the material relative to the first machine, a frequency changer for varying the frequency of the current supplied to the second motor whereby the speed relation of the second machine relative to the first machine may be varied, and means controlled by said photo-electric means for changing the effect of the frequency changer whereby certain operating parts of the first machine may be caused to have a substantially fixed relation to the indicia on the material.

4. In a control system for apparatus operating on web material having indicia thereon, said apparatus having devices including a motor operated cutter for the web and other motor operated devices for feeding the web to the cutter, in combination, a source of light, light-sensitive means disposed to receive light from said source of light, said indicia and web being disposed to control the amount of light received by the light-sensitive means from said light, and electrical control means responsive to said light-sensitive means to electrically vary the operating characteristic of said electric circuit means to substantially fix the operating relation of the cutter with reference to the indicia, electric circuit means interconnected with the motors for the cutter and feeding devices for varying the speed between the cutter and the feeding devices.

5. In a control system for apparatus operating on a web, said apparatus having a cutter and a feeding device for feeding the web to the cutter, in combination, a source of light, light-sensitive means responsive to certain changes in relationship between the web and the cutter, electric means for controlling the speed relation between the cutter and the device for feeding the web to the cutter, and electrical control means controlled by the light-sensitive means for automatically electrically controlling said electric means to maintain a certain relationship in the operating characteristics of the cutter and feeding device.

6. In a control system for apparatus operating on a web, in combination, a web cutter, a motor for driving the cutter, web-feeding means, electrical transmission means intermediate the motor and the web-feeding means including means for driving the web-feeding means, speed-control means including photo-sensitive means responsive to the movement of indicia on the web past a given point for electrically changing the electrical transmission characteristics of said transmission means to change the speed relation between the cutter and the web-feeding means, and means responsive to a given change in operating relationship between the cutter and the web to electrically control the operation of said speed-control means.

7. A control system for apparatus operating on web material, said apparatus including a cutter for cutting the web, a feeding device for feeding the web to the cutter, a cutter for driving the cutter motor, a motor coupled to the feeding device for driving the feeding device in combination with, a source of light, light-sensitive means disposed to be influenced by the passing web and the source of light, said web having indicia therein for controlling the amount of light falling on the light-sensitive means, and electrical control means caused to operate by said light-sensitive means when the indicia on the web has a given position with reference to the cutter to electrically control the speed of the feeding motor.

8. A control system for apparatus operating on web material, said apparatus including a cutter for cutting the web and feeding means for feeding the web to the cutter, a motor for operating the cutter, a motor coupled directly to the feeding means for operating the feeding means, in combination with, a source of light, light-sensitive means disposed to be influenced by the passing web and the source of light, said web having indicia thereon for controlling the amount of light falling on the light-sensitive means, and electrical control means including a pair of speed-control contactors one of which is adapted to establish circuits for the feeding motor to increase its speed and the other is adapted to establish circuits for the feeding motor to decrease its speed, a controller driven by the cutter motor, a control contactor controlled by the light-sensitive means and thus adapted to operate each time the indicia on the web passes a given point, said controller in cooperation with said control contactor being adapted to selectively establish operating circuits for said speed-control contactors when the indicia on the web is in a position other than the desired position.

9. In a system of control for a machine operating on web material, in combination, a synchro-tie system including a transmitter and a receiver, a machine for feeding the material and a machine for receiving the material, said transmitter being coupled to the web receiving machine and said receiver being coupled to the web feeding means, a source of energy for said synchro-tie system, means for varying the frequency of the energy supplied to the receiver whereby the receiver may be caused to operate at the same or a different speed than said transmitter, and electronic means, responsive to the position of the web of material with reference to the machine receiving the material, adapted to control the means for varying the frequency of the energy supplied to the receiver.

10. In a system of control for apparatus operating on material, in combination, a machine for effecting certain operations on the material, a machine for feeding the material to said first named machine, a motor having a primary winding and a secondary winding coupled to drive one of said machines, a second motor having primary and secondary windings coupled to drive the web feeding machine, circuit connections interconnecting said secondary windings, means adapted to supply electric energy to the respective primary windings having different characteristics to thus cause said motors to operate at different speeds, and electronic means responsive to the position of said material adapted to change the operating characteristics of said last named means.

11. An electrical system of control for controlling the speed relation between a web cutter and a web feeding device, in combination, a web cutter, a web-feeding device, a dynamo-electric machine operating at a speed proportional to the web cutter, a motor for driving the said device, electric circuit connections between the dynamo-electric machine and said motor whereby the speed of said motor is made a function of the speed of said cutter, said circuit connections including a control device, adapted to operate as a function of the speed of movement of the web to the cutter and adapted to control the speed relation of the dynamo-electric machine and the motor.

12. An electrical system of control for controlling the speed relation between a web cutter and a web feeding device, in combination, a web cutter, a web feeding device, a dynamo-electric machine operating at a speed proportional to the web cutter, a motor for driving the said device, electric circuit connections between the dynamo-electric machine and said motor whereby the speed of said motor is made a function of the speed of said cutter, said circuit connections including photoelectric means, responsive to the speed of the web relative the cutter, adapted to control the speed relation of the dynamo-electric machine and the motor.

13. An electrical system of control for controlling the speed relation between a web cutter and and a web feeding device, in combination, a web cutter, a web feeding device, a dynamo-electric machine operating at a speed proportional to the web cutter, a motor for driving the said device, electric circuit connections between the dynamo-electric machine and said motor whereby the speed of said motor is made a function of the speed of said cutter, said circuit connections including a control device, adapted to vary the characteristics of the electric current in the said electric circuit connections to thus control the relative operating characteristics of the dynamo-electric machine and the motor.

14. An electrical system of control for controlling the speed relation between a web cutter and a web feeding device, in combination, a web cutter, a web feeding device, a dynamo-electric machine operating at a speed proportional to the web cutter, a motor for driving the said device, electric circuit connections between the dynamo-electric machine and said motor whereby the speed of said motor is made a function of the speed of said cutter, said circuit connections including photoelectric means, responsive to the speed of the web relative the cutter, adapted to vary the characteristics of the electric current in the said electric circuit connections to thus vary the relative operating characteristics of the dynamo-electric machine and the motor.

15. In a system of control for controlling the relative speeds of two motors, in combination, a main motor, a dynamo-electric machine coupled to the main motor, said two motors comprising a variable speed motor and a constant speed motor, a source of electrical energy for the main motor, control means for directly interconnecting both of said two motors with said dynamo-electric machine, and means for changing the characteristics of an electric current from said dynamo-electric machine, said means for changing the characteristics of an electric current being adapted to vary the speed of the variable speed motor with reference to the speed of the constant speed motor.

OSCAR C. CORDES.

CERTIFICATE OF CORRECTION.

Patent No. 2,075,095. March 30, 1937.

OSCAR C. CORDES.

It is hereby certified that error appears in the printed specification of the above numbered patent requiring correction as follows: Page 4, second column, line 41, claim 7, for the word "cutter" second occurrence, read motor; line 42, same claim, strike out "motor" first occurrence; and that the said Letters Patent should be read with these corrections therein that the same may conform to the record of the case in the Patent Office.

Signed and sealed this 15th day of March, A. D. 1938.

(Seal)

Henry Van Arsdale,
Acting Commissioner of Patents.